(12) United States Patent  
Sullivan et al.

(10) Patent No.: US 8,260,733 B2  
(45) Date of Patent: Sep. 4, 2012

(54) NEURAL NETWORK SYSTEM AND METHOD FOR CONTROLLING INFORMATION OUTPUT BASED ON USER FEEDBACK

(75) Inventors: Alan Sullivan, Hagerstown, MD (US); Ivan Pope, London (GB)

(73) Assignee: Garbortese Holdings, LLC, Dover, DE (US)

( * ) Notice: Subject to any disclaimer, the term of this patent is extended or adjusted under 35 U.S.C. 154(b) by 0 days.

(21) Appl. No.: 11/544,858

(22) Filed: Oct. 10, 2006

(65) Prior Publication Data

US 2007/0038588 A1 Feb. 15, 2007

Related U.S. Application Data

(60) Division of application No. 10/928,278, filed on Aug. 30, 2004, now Pat. No. 7,120,615, which is a continuation of application No. 09/241,440, filed on Feb. 2, 1999, now Pat. No. 6,792,412.

(51) Int. Cl.
*G06E 1/00* (2006.01)
*G06E 3/00* (2006.01)
*G06F 15/18* (2006.01)
*G06G 7/00* (2006.01)

(52) U.S. Cl. ......................................................... 706/21

(58) Field of Classification Search .................... 706/15, 706/21
See application file for complete search history.

(56) References Cited

U.S. PATENT DOCUMENTS 3,541,541 A * 11/1970 Engelbart ..................... 345/164
4,999,833 A    3/1991 Lee
5,197,114 A    3/1993 Skeirik
(Continued)

FOREIGN PATENT DOCUMENTS

WO    9820418 A1    5/1998
(Continued)

OTHER PUBLICATIONS

Graetz, Kenneth, Charles Kimible, Pamela Thompson, and Julie Garloch "Information Sharing in Face to Face, Teleconferencing, and Electronic Chat Groups" United States Air Force Armstrong Laboratory. Oct. 1997. p. 1-31. [Online] Downloaded Apr. 7, 2011. http://www.dtic.mil/cgi-bin/GetTRDoc?Ad=ADA333568&Location=U2& doc=GetTRDoc.pdf.*

(Continued)

*Primary Examiner* — Kakali Chaki
*Assistant Examiner* — Ben Rifkin
(74) *Attorney, Agent, or Firm* — Turocy & Watson, LLP

(57) ABSTRACT

A system and method for controlling information output based on user feedback about the information is provided. At least one neural network module selects one or more of a plurality of objects to receive information from a plurality of information sources based at least in part on a plurality of inputs and a plurality of weight values during an epoch. The information sources may include electronic mail providers, chat participants, or page links. Recipients of the objects provide feedback about the information during an epoch. At the conclusion of an epoch, the neural network takes the feedback and generates a rating value for each of the plurality of objects. Based on the rating value and the selections made, the neural network redetermines the weight values within the network. The neural network then selects the objects to receive information during a subsequent epoch using the redetermined weight values and the inputs for that subsequent epoch.

25 Claims, 12 Drawing Sheets

U.S. PATENT DOCUMENTS

| | | | |
|---|---|---|---|
| 5,390,281 A | 2/1995 | Luciw et al. | |
| 5,410,344 A | 4/1995 | Graves et al. | |
| 5,446,891 A | 8/1995 | Kaplan et al. | |
| 5,504,675 A | 4/1996 | Cragun et al. | |
| 5,515,098 A | 5/1996 | Carles | |
| 5,561,741 A | 10/1996 | Wasserman | |
| 5,636,346 A | 6/1997 | Saxe | |
| 5,642,502 A * | 6/1997 | Driscoll | 707/5 |
| 5,692,107 A | 11/1997 | Simoudis et al. | |
| 5,724,567 A | 3/1998 | Rose et al. | |
| 5,727,128 A | 3/1998 | Morrison | |
| 5,727,129 A | 3/1998 | Barrett et al. | |
| 5,754,938 A * | 5/1998 | Herz et al. | 725/116 |
| 5,754,939 A * | 5/1998 | Herz et al. | 455/3.04 |
| 5,758,257 A | 5/1998 | Herz et al. | |
| 5,765,028 A | 6/1998 | Gladden | |
| 5,774,357 A * | 6/1998 | Hoffberg et al. | 713/600 |
| 5,781,698 A | 7/1998 | Teller et al. | |
| 5,781,703 A | 7/1998 | Desai et al. | |
| 5,787,234 A | 7/1998 | Molloy | |
| 5,790,935 A | 8/1998 | Payton | |
| 5,794,237 A * | 8/1998 | Gore, Jr. | 707/5 |
| 5,802,253 A | 9/1998 | Gross et al. | |
| 5,822,744 A | 10/1998 | Kesel | |
| 5,835,087 A | 11/1998 | Herz et al. | |
| 5,848,396 A | 12/1998 | Gerace | |
| 5,855,015 A | 12/1998 | Shoham | |
| 5,873,080 A * | 2/1999 | Coden et al. | 707/3 |
| 5,874,955 A | 2/1999 | Rogowitz et al. | |
| 5,956,702 A | 9/1999 | Matsuoka et al. | |
| 5,974,412 A | 10/1999 | Hazlehurst et al. | |
| 5,991,735 A | 11/1999 | Gerace | |
| 6,047,277 A | 4/2000 | Parry et al. | |
| 6,058,206 A | 5/2000 | Kortge | |
| 6,085,178 A | 7/2000 | Bigus | |
| 6,108,648 A | 8/2000 | Lakshmi et al. | |
| 6,119,112 A | 9/2000 | Bush | |
| 6,145,751 A | 11/2000 | Ahmed | |
| 6,154,783 A | 11/2000 | Gilmour | |
| 6,192,354 B1 | 2/2001 | Bigus et al. | |
| 6,266,664 B1 | 7/2001 | Russell-Falla et al. | |
| 6,266,668 B1 | 7/2001 | Vanderveldt et al. | |
| 6,272,479 B1 | 8/2001 | Farry et al. | |
| 6,314,420 B1 | 11/2001 | Lang et al. | |
| 6,321,205 B1 | 11/2001 | Eder | |
| 6,360,131 B1 | 3/2002 | Cheng | |
| 6,366,896 B1 | 4/2002 | Hutchison | |
| 6,556,980 B1 | 4/2003 | Cheng | |
| 6,560,592 B1 | 5/2003 | Reid et al. | |
| 6,567,814 B1 | 5/2003 | Bankier et al. | |
| 6,574,632 B2 | 6/2003 | Fox et al. | |
| 6,601,051 B1 | 7/2003 | Lo et al. | |
| 2002/0168621 A1 | 11/2002 | Cook | |

FOREIGN PATENT DOCUMENTS

| | | |
|---|---|---|
| WO | 9822885 A1 | 5/1998 |

OTHER PUBLICATIONS

Lewis, Floyd and Robert Spich. "Principled Negotiation, Evolutionary Systems Design, and Group Support Systems: A Suggested Integration of Three Approaches to Improving Negotiations" Proceedings of the 29th Annual Hawaii International conference on System Sciences 1996. p. 238-250. [Online] Downoaded Apr. 7, 2011.*

Continued from above: http://ieeexplore.ieee.org/stamp/stamp.jsp?tp=&arnumber=493195.*

Ingrid Russell, Collegiate Microcomputer Journal, "The Delta Rule," http://uhavax.hartford.edu, printed on Jan. 4, 1999 (one page).

Autonomy Inc, "Autonomy Agentware Technology White Paper," www.autonomy.com, 1998, p. 1-14.

Autonomy Inc, "Autonomy Delivers Agentware i3 Product Line," http://www.autonomy.com/press/pr970805.htm, accessed Apr. 26, 1999, p. 1-7.

Sixdegrees, www.sixdegrees.com, accessed Apr. 26, 1999, (19 pages).

Autonomy, "Autonomy Knowledge management and New Media Content Solutions," http://www.autonomy.com/, accessed Apr. 26, 1999, (26 pages).

Firefly, www.firefly.net, accessed Apr. 26, 1999, (19 pages).

OA dated Sep. 29, 2005 for US Application U.S. Appl. No. 10/928,278, 8 pages.

Engage Technologies Inc., http://www.engage.com, 1998 (31 pages).

Christos Stergiou & Dimitrios Siganos, "Neural Networks," http://www-dse.doc.ic.ac.uk/-nd/surprise_96/journal/vol14/cs11/report.html, accessed Jan. 4, 1999, p. 1-22.

Autonomy Inc, "Knowledge Suite," http://www.autonomy.comitech/butlerreport.htm, accessed Apr. 26, 1999, p. 1-9.

El-Zoghabi et al, "A Client-Server Computing Model for Hetercigeneous Distributed Management," IEEE, Apr. 1993 (Abstract).

O'Leary, "The Internet, Intranets, and the AI Renaissance," Computer, Jan. 1997, pp. 71-78.

Tan et al. "Learning User Profiles for Personalized Information Dissemination," IEEE, 1998, pp. 183-188.

Khan et al, "Personal Adaptive Web Agent: A Tool for Information Filtering," Department of Electrical and Computer Engineering: University of Manitoba, 1997, pp. 305-308.

Orwig et al, "A Graphical Self-Organizing Approach to Classifying Electronic Meeting Output," Journal of the American Society for Information Science, 1997, pp. 157-170.

* cited by examiner

NEURAL NETWORK SYSTEM AND METHOD FOR CONTROLLING INFORMATION OUTPUT BASED ON USER FEEDBACK

This application is a divisional of U.S. patent application Ser. No. 10/928,278, filed Aug. 30, 2004, now U.S. Pat. No. 7,120,615; which is a continuation of U.S. patent application Ser. No. 09/241,440, filed Feb. 2, 1999, now U.S. Pat. No. 6,792,412, both patents of which are incorporated by reference herein in their entirety.

FIELD OF THE INVENTION

This invention relates to a system and method for controlling information output based on user feedback regarding that information. More particularly, the invention relates to a computer network-based neural network system that controls information provided as output from the system based on learned experience gained from user feedback regarding the value of the information.

BACKGROUND OF THE INVENTION

With the proliferation of network connectivity between users of computer systems, a vast amount of information has become readily available to those users. Indeed, many call recent times the "information age" because of the ease of gaining access to information from homes and businesses throughout the world. As the amount of available information increases, users have become overwhelmed because they simply do not have enough time or sufficient resources to absorb all of that information in any meaningful way.

Accordingly, users have created information filters of various types in an attempt to filter through the large value of information to derive useful information. Some electronic mail receiving programs parse incoming messages and filter out messages based on content or the initiator of the message. Search engines have been created in an attempt to identify relevant web pages on the Internet out of the millions of such pages that exist and the vast numbers of new pages that are created on a daily basis.

These systems all suffer from various drawbacks. To filter based on some characteristic of an electronic mail message, the electronic mail filtering system requires that such attributes be determined beforehand and provided for the filtering. The filtering system then filters every message having designated attributes. That requires identification of those attributes that are to be excluded before being able to create the filter. It is often difficult to determine the proper attributes to be used as the basis for the filtering.

Similarly, in some existing chat rooms, a user may select participants from whom to receive information. Other persons are excluded, even if the information they might provide would be useful to that user and even if the other participants in the chat room find that information to be useful. Such selections are inflexible to changing circumstances and again, like the electronic mail example, require the user to select those participants to include or exclude from the chat room without regard to the substance of the contribution those participants will make.

In other situations, web pages may include a number of links to other web pages. Sometimes these pages may contain hundreds or thousands of links and often new links being added. It may be difficult for a user to find or remember the links that were previously useful the next time the user opens that link directory page with such a large volume of links.

Further, although search engines exist to enable users to locate pages based on key words contained in the page, these engines also suffer from drawbacks. Many pages incorporate a large volume of words so that those pages will provide "hits" to the search engines that include those words. Often the page may contain such words even though the subject matter of the page may have little or nothing to do with the words that are included. Inclusion of words in this manner may render current search engines less useful in identifying pages with information that is likely to be useful to the user.

Other drawbacks also exist with current systems.

SUMMARY OF THE INVENTION

Accordingly, it is an object of the present invention to overcome these and other drawbacks of current systems.

One object of the present invention is to provide a system and method for delivering information over a network which selects information for delivery based on indications of what subject matter a recipient is likely to find useful.

Another object of the present invention is to provide a system and method for delivering information to users over a network based on learned preferences of users of that information.

Another object of the present invention is to provide a system and method for developing affiliations between information sources, information recipients, and information content.

Another object of the present invention is to provide a system and method for employing feedback about information provided over a network which is used to determine what information to provide to particular users in the future.

Another object of the present invention is to provide a system and method for automatically determining preferences of recipients and users of information distributed over a network.

Another object of the present invention is to provide a system and method for automatically determining relationships between attributes of information and user determinations regarding the usefulness of that information.

Accordingly, a system and method is provided for accomplishing these and other objects of the present invention. According to the present invention, a neural network system may be provided between a plurality of information sources and a plurality of information recipients. The neural network learns what information to provide from the information sources to the information recipients based on feedback provided by the feedback recipients regarding the usefulness of the information.

The information sources may comprise electronic mail providers, chat participants, and/or web page links, for example. The recipients may comprise electronic mail recipients, chat participants, and/or web page viewers, for example. Also, the input upon which the neural network bases its determination, for example, may comprise attributes of the electronic mail providers, chat participants, key words, and/or web pages. Accordingly, the present invention is applicable to a wide range of network-based applications and it enables the development of information sharing communities based on attributes and preferences of the recipients and providers. The system may also be hierarchical and connected to other learning systems to provide a scalable information distribution network.

Accordingly, the system may comprise a vast interconnection of information sources and recipients including news services, electronic mail, chat and web-based content. The system may bring together people and enhance the relevance of the information that reaches users on the system. The system may provide relevant electronic mail messages, help users find appropriate web pages through search engines and link directory pages, and may provide improved chat discussions by reducing the amount of non-useful content.

Although some objects and advantages of the present invention have been described, other advantages of the present invention will be apparent from reviewing the detailed description and drawings of the present invention set forth herein.

DETAILED DESCRIPTION OF THE PRESENT INVENTION

Figure 1:
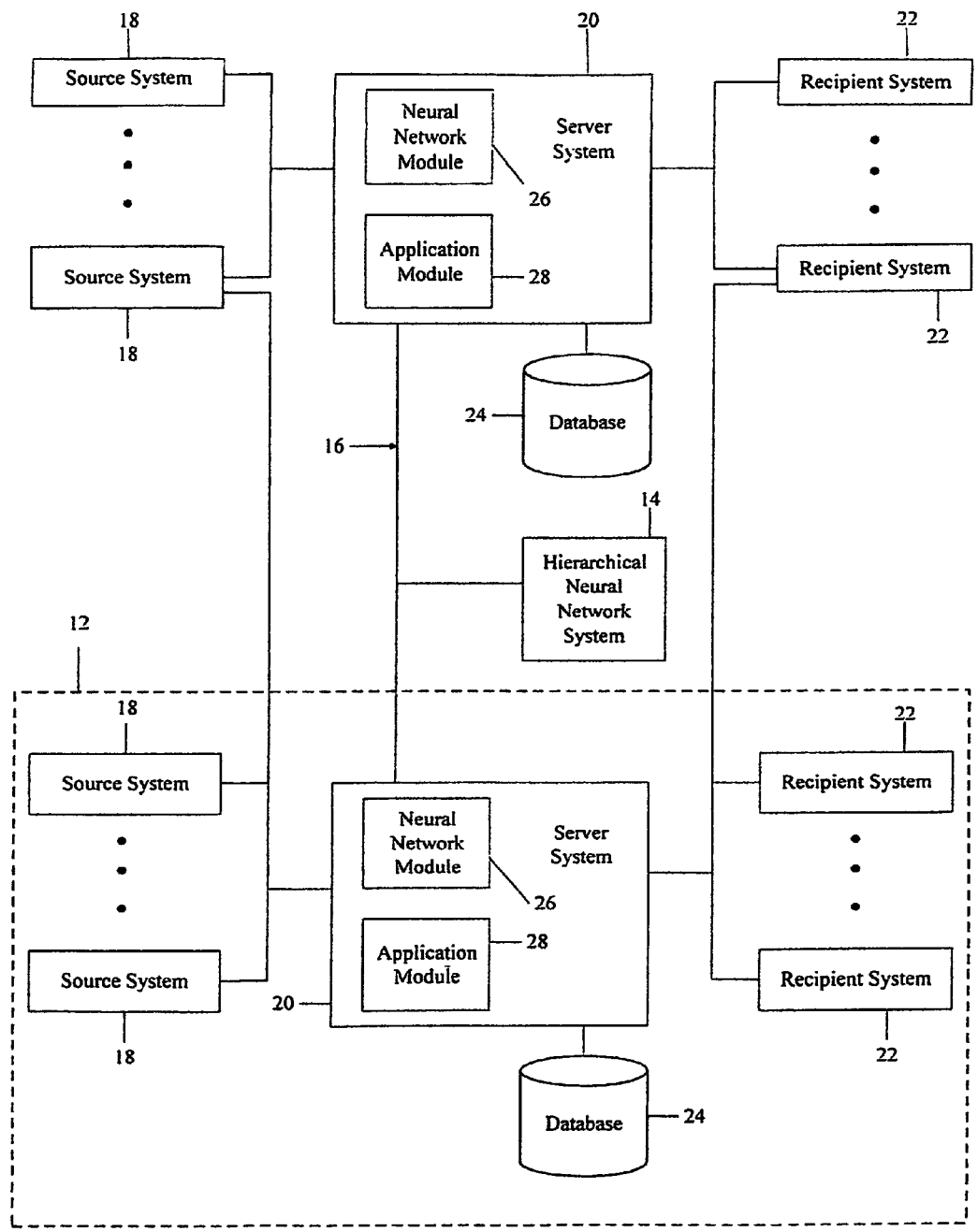
FIG. 1 is a block diagram of an overall system according to an embodiment of the present invention.

According to the present invention, a system, method and computer medium is provided for distributing information to users based on learned preferences for that information. Specifically, the system uses an artificial intelligence agent interposed between information sources and information recipients which learns preferences of the recipients that the artificial intelligence agent then uses to distribute information during subsequent distributions. A neural network module may be used according to an embodiment of the present invention as the artificial intelligence agent because it is capable of learning relationships between a plurality of inputs and a plurality of outputs.

To aid in understanding the present invention, certain terms are used to describe various components of the embodiments described herein. Accordingly, the term information sources should be understood to refer to various sources that provide information to the system for distribution to various recipients and may include electronic mail providers, chat participants, or links that may be included in a page, for example.

Page may be understood to be any collection of data that is presented to a user, such as through a graphical user interface, and may include web pages, documents and the like, for example.

Link may be understood to be a reference to a page or pages. A link may be activated to cause the computer to retrieve the referred page for presentation to the user of the computer. Link may include hyper links to web pages, hyper links to documents within a database and the like, for example.

A link directory page may be understood to be any collection of data which comprises at least a portion where a plurality of links may be included. The link directory page may comprise a plurality of slots where links may be inserted. The number of slots may be adapted to the number of links that are included. A link directory page may include search result pages, web pages with selected links, and the like, for example.

According to one embodiment, a neural network system may be provided. Neural networks take a plurality of inputs, apply those inputs to weight values and thresholds within the neural network and generate outputs. The neural network may correct the weight values based on differences between the generated output and the expected output which may be determined based on feedback.

Accordingly, herein, the term input should be understood to refer to variable values taken by the neural network to compute output. Inputs may be binary and therefore represent the existence or absence of a particular item or may be numeric and represent the value within a range for a particular item. The inputs may include the information sources, attributes about the information sources, attributes about information being provided, or attributes about information including attributes of electronic mail providers, attributes of chat participants, key words, and/or attributes of web pages.

Weight values should be understood to be numeric designations within a certain range determining the multiplying factor for a particular input value to a node within the neural network. Thresholds are values assigned to particular nodes within a neural network to determine whether that node generates an output. Weight values and thresholds are commonly understood terms in neural networks and the term is used herein consistent with that understanding.

The term output should be understood to correspond to the values generated by neural network based on the inputs, weight values, and thresholds, for example. Outputs may correspond to objects to receive information.

Object is a term used herein to describe where the neural network places the information provided by the information sources based on output values corresponding to those objects. Objects may include slots within a link directory page, electronic mail messages, chat participant viewers, pages, or any other destination for placement of information, for example.

Recipient should be understood to be any person or machine that is able to view or receive an object containing information and may include electronic mail recipients, chat participants, web browsers, and the like, for example.

Feedback may comprise responses received or assigned based on predetermined algorithms corresponding to one or more outputs from the neural network. Feedback may include usefulness ratings, timeliness ratings, value ratings, ratings, like-dislike rating or the like, for example.

With this general understanding in mind, these terms are not given to be exclusive and may include other elements as one of ordinary skill in the art would understand from the following description of various embodiments of the present invention.

According to one embodiment of the present invention, a neural network system selects one or more of a plurality of objects to receive information from the plurality of information sources based at least in part on a plurality of inputs and a plurality of weight values during that a predetermined time, or epoch. At least one server, associated with the neural network module, provides one or more of the objects to a plurality of recipients. The recipients provide a mechanism that enables users to generate feedback about the information. At the conclusion of a predetermined event, or epoch, the neural network takes the feedback provided from the recipients and generates a rating value for each of the plurality of objects. Based on the rating value and the selections made, the neural network redetermines the weight values within the network. This may be considered to be a batch prorogation process whereby multiple feedback values are used to recalculate the weight values. It is also possible to recalculate the weight values for each feedback value received. In either event, the neural network then selects the objects to receive information during a subsequent epoch using the redetermined weight values and the inputs for that subsequent epoch.

One object may be provided to one recipient. For example, one specific electronic mail message object may be provided to one specific recipient corresponding to that object. Also, multiple objects may be provided to each recipient. For example, a link directory page containing a plurality of slot objects may be provided to a plurality of recipients.

The neural network may use thresholds to select the one or more of a plurality of objects to receive information. Accordingly, the recipients may comprise a mechanism that enables users to modify the thresholds used by the neural network. As such, the user may modify the amount of information received by modifying the thresholds.

To provide a scalable, hierarchical system, according to one embodiment, each input and object may be assigned a unique identifier associated therewith. Lower tier systems may comprise at least one of the neural network modules, at least one server and a plurality of recipients. A hierarchical neural network system may be connected to the plurality of lower tier systems. The hierarchical neural network may use the unique identifiers to track inputs and objects throughout the lower tier systems as inputs and objects may be shared by multiple lower tier systems.

A block diagram of an overall system structure according to an embodiment of the present invention is depicted in FIG. 1. An overall system 10 comprises a plurality of lower tier systems 12 connected to a hierarchical system 14 over a network 16. Each lower tier system 12 may comprise one or more source systems 18, one or more server systems 20, and one or more recipient systems 22. Server system 20 may comprise a neural network module 26 and one or more application modules 28. One or more databases 24 may be operatively connected to server 20. The operation of hierarchical neural network system 14 is described below after first providing a description of lower tier system 12.

Network 16 may comprise any information distribution system such as the Internet, intranets, WANs, LANs, cable television distribution systems, electrical power distribution systems, or other arrangements. Network 16 may comprise a series of wired connections including fiber optic cable, coaxial cable, electric power lines, telephone lines, and the like, or may comprise a series of wireless transmission connections, or a combination of the above. Network 16 may include switches and distribution hubs and other intermediate server systems to relay information from point to point within the network. Accordingly, the term network as used herein should be interpreted broadly to include any arrangement of information transmission from one point to another point. One particular application, according to the present invention, involves use of the Internet as the network. Accordingly, for purposes of illustration, network 16 may comprise the Internet as at least one component.

The overall operation of lower tier systems 12 is as follows. One or more source systems 18 supply information to server system 20. At server system 20, one or more application modules 28 may receive the information for further processing as described below. Neural network module 26 then determines which of a plurality of objects should receive the information received. Neural network module 26 receives a plurality of inputs and then selects which of a plurality of objects to receive information supplied from source systems 18. Neural network module 26 treats each of the inputs as an input node in a neural network and each of the objects as an output node for the neural network. Further, a weight matrix comprising weight values and threshold matrix comprising thresholds are used by the neural network. Such matrices may be stored in database 24, for example, as described in more detail below with respect to FIGS. 3 and 4. The neural network thereby generates an output vector corresponding to the plurality of objects. The value of the output vector thereby indicates which of the objects should receive information. Neural network module 26 may then use the output vector to select which objects are to receive the information so application module 28 may supply that information accordingly.

Figure 2:
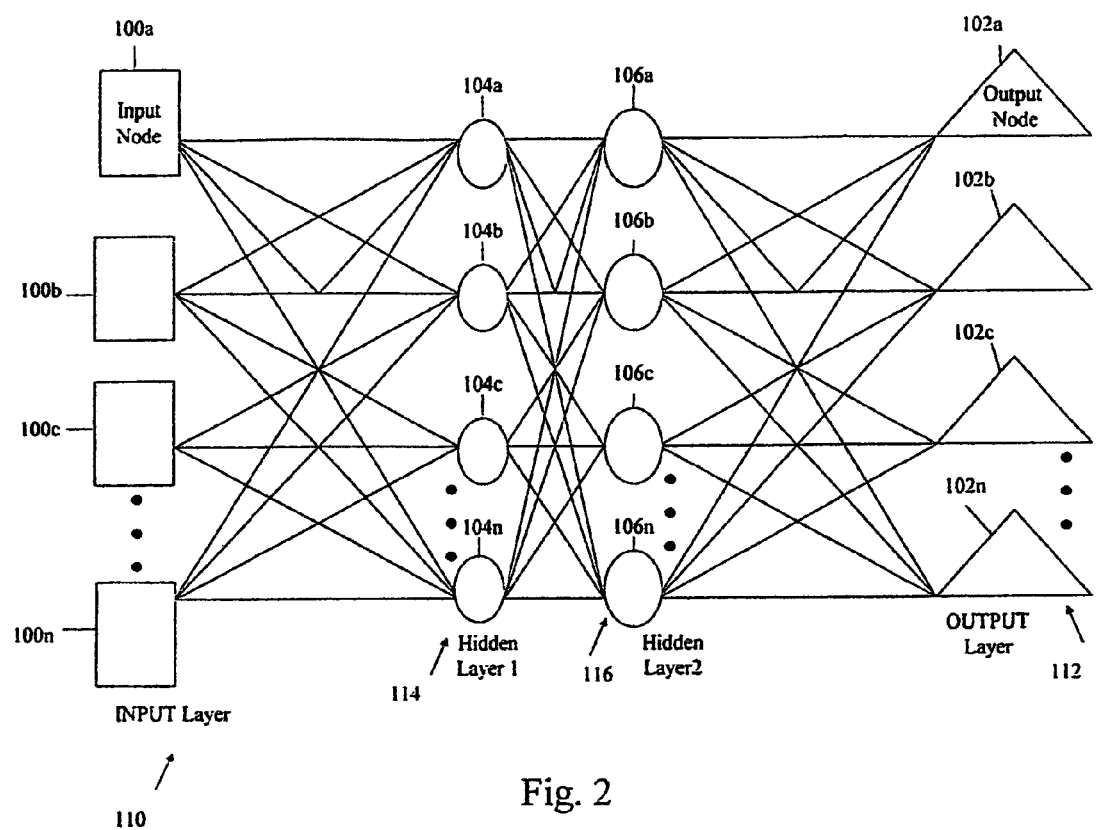
FIG. 2 is a block diagram of a neural network according to an embodiment of the present invention.

Operation of neural network module 26 may be better understood with reference to FIG. 2. FIG. 2 depicts a schematic diagram of a neural network according to an embodiment of the present invention. The neural network comprises a plurality of input nodes 100 forming an input layer 110, a plurality of output nodes 102 forming an output layer 112, and a plurality of hidden nodes 104 and 106 which form hidden layers 114 and 116. The neural network may operate using feedback techniques such as the backpropogation algorithm, or any other feedback based adaptive learning algorithm.

The neural network may operate as a binary system where each input node is either on or off (i.e., either one or zero). The neural network system may also determine a value for each of the input nodes. For purposes of illustration, a binary system is described.

The neural network receives a binary value for each input node and determines a binary value for each of the output nodes. A calculation is made at each hidden node within the neural network. These calculations are performed by starting with the first hidden layer using the value of the input nodes and then using the output values for the first hidden layer as inputs to the second hidden layer. The output values from the second hidden layer are then used to determine the value of the output layer.

At each node (also called a neuron), the node produces a one output if the sum of the product of each input times an associated weight value exceeds a threshold for that node. In this binary example, the threshold may be set to a number between 0 and 1. A threshold of 0 indicates that the node is always going to turn on and a threshold of 1 means that the node is going to turn on seldom if at all.

Each input to a node has a weight value corresponding to it. When a neural network has not been used, the weight values may be pre-assigned either randomly or specifically selected. According to one embodiment of the present invention, the weight value for each input may be assigned to be equal to the threshold value divided by the total number of inputs. For example, for a threshold of 0.5 and four inputs, as in FIG. 2 for node 104a, the weights for each of the inputs 100a, 100b, 100c, and 100n may be 0.125.

Calculations are performed for each node within the network until values are determined for the output nodes. The output value represents the neural network's learned prediction for the output that should be generated based on the input provided and past performance as reflected in the weight values and the threshold values.

After output has been provided to the output nodes, feedback may be provided to the neural network to allow the network to learn whether the output generated was appropriate. A correction or learning algorithm may then be used by the neural network to adjust the weight values based on errors between the output values and the feedback values.

Learning algorithms adapt to changes in input by modifying weight values used by the neural network. A number of learning rules are available for use by neural network modules, and any of these rules may be used according to the present invention. For example, pattern association, the Hebb rule, the Delta Rule, the Generalized Delta Rule, Standard backpropagation, enhanced backpropagation, batch backpropagation, backpropagation with weight decay, quickprop, Rprop, backpercolation 1, counterpropagation, DLVQ, the Cascade Correlation algorithm, the recurrent Cascade-Correlation algorithm, or any other learning rule or learning rule using pattern associators may be used.

According to one embodiment, the back-propagation algorithm may be used to adjust the weight values based on a comparison of the output generated and the feedback provided. That algorithm may involve use of the sigmoid function, which is a non-linear function. Other functions may also be used, including the linear or threshold functions.

The operation of the backpropagation algorithm and many of the other functions described above may be according to known algorithms. Such algorithms are described in detail in one or more of the following articles:

Backpropagation: Past and future, in *Proceedings of the IEEE International Conference on Neural Networks*, pages 343-353. IEEE Press, 1988;

Scott E. Fahlman. Faster-learning variations on back-propagation: An empirical study. In T. J. Sejnowski G. E. Hinton and D. S. Touretzky, editors, 1988 *Connectionist Models Summer School*, San Mateo, Calif., 1988;

Morgan Kaufmann; M Riedmiller and H Braun. A direct adaptive method for faster backpropagation learning: The RPROP algorithm, in *Proceedings of the IEEE International Conference on Neural Networks* 1993 (*ICNN 93*), 1993;

S. E. Fahlman and C. Lebiere. The cascade-correlation learning architecture. Technical Report CMU-CS-90-100, School of Computer Science, Carnegie Mellon University, August 1991;

Rumelhart, D. E., Hinton, G. E., and Williams, R J. (1986a). Learning internal representations by error propagation, in Anderson, J. A. and Rosenfeld, E., editors, *Neurocomputing. Foundations of Research*, chapter 41, pages 673-695. The MIT Press, Cambridge, Mass.;

Rumelhart, D. E., Hinton, G. E., and Williams, R. J. (1986b). Learning representations by back-propagating errors, in Anderson, J. A. and Rosenfeld, E., editors, *Neurocomputing. Foundations of Research*, chapter 42, pages 673-674, 696-699. The MIT Press, Cambridge, Mass.;

D. E. Rumelhart and J. L. McClelland. *Parallel Distributed Processing*, volume 1. MIT Press, 1986.

In general the delta rule outperforms the Hebbian learning rule. The delta rule is also less likely to produce explosive growth in the network. For each learning cycle the pattern is propagated through the network n cycles (a learning parameter) times after which learning occurs.

The backpropagation algorithm makes use of gradient calculations. Generally, all of the weights in the network are initialized to have small, random values. This should mean that the net activation value for the output layer is almost zero. The weight training process then continues by identifying which patterns occur in the current training epoch and calculating the network's output for each pattern. For each pattern or set of input values, a gradient (weight update) is evaluated which is then averaged over each pattern before the weights are actually changed. The two most common epoch sizes are 1 (present pattern and then update weights before presenting next pattern) or P (present all patterns before averaging gradients and performing a single weight update). Training may cease when the performance of the network falls beneath some pre-specified error tolerance or the number of learning steps exceeds some maximum value. In order to calculate the current performance of a network, the complete data set is used to query the network and Mean Square Error value is calculated, without updating the weights. Sometimes, the data is split into a training and a testing set, where the training set is used to calculate the weight update gradients and the testing set is used to decide when to stop learning.

Figure 3:
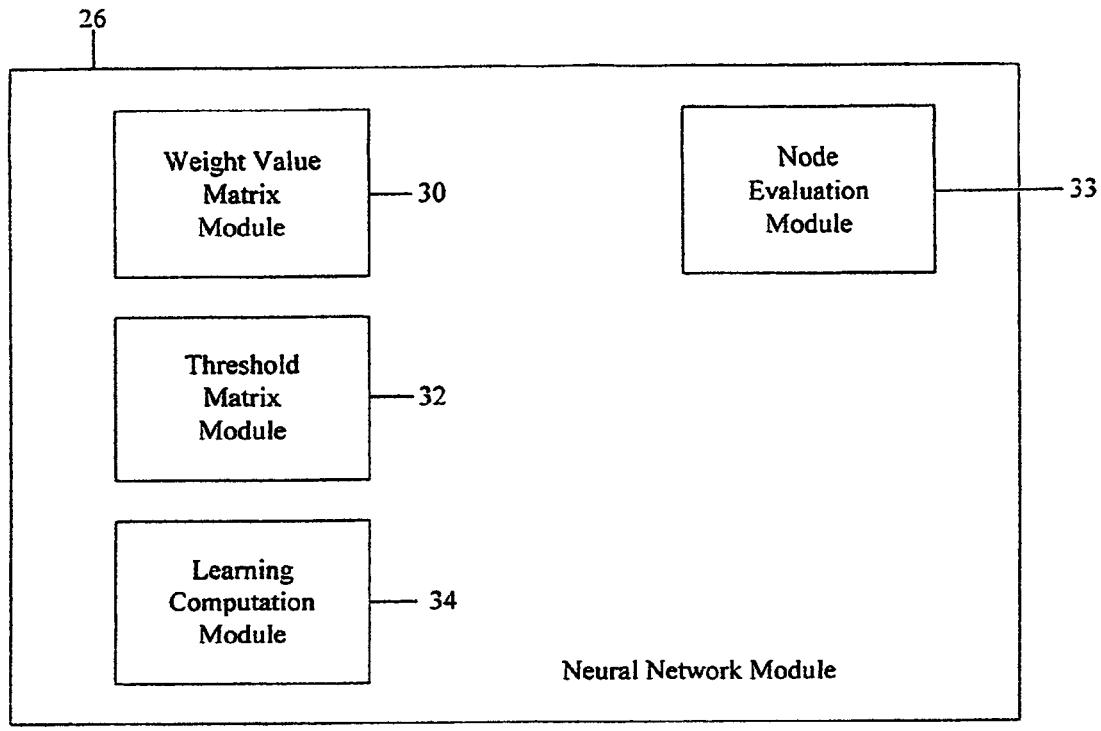
FIG. 3 is a block diagram of a neural network module according to an embodiment of the present invention.
Figure 4:
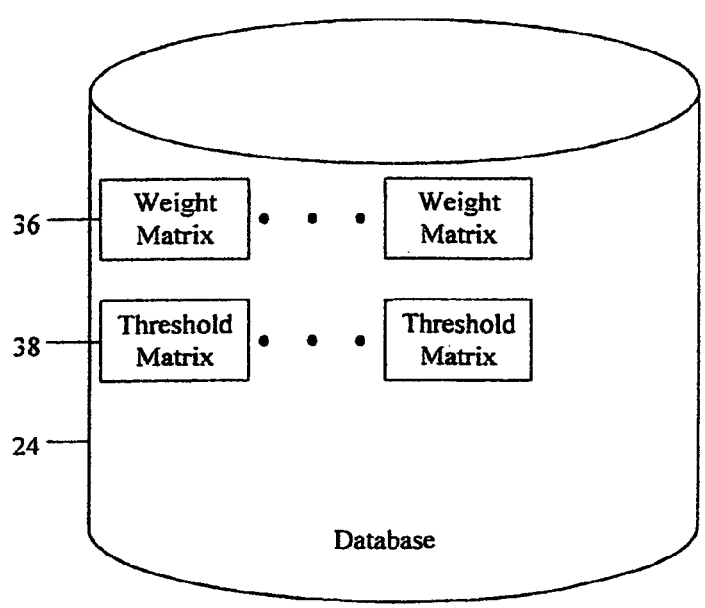
FIG. 4 is a block diagram of a database system for use with a neural network module according to an embodiment of the present invention.

Accordingly, as depicted in FIG. 3, neural network module 26 may comprise a weight value matrix module 30, a threshold matrix module 32, a node evaluation module 33, and a learning computation module 34. Weight value matrix module 30 may comprise a module that creates, manipulates and stores weight vectors for each node within the neural network. Because each node has a plurality of weight values, each weight value corresponding to an input to the node, those weight values may be represented as a vector. The combination of vectors for all of the nodes in the neural network may be represented as a weight matrix. That weight matrix may then be stored in database 24 as one or more weight matrices 36, as depicted in FIG. 4. Weight value matrix module 30 may comprise computer readable code that causes neural network module 26 to operate according to the description above.

Threshold matrix module 32 may comprise a module that creates, manipulates, and stores the threshold values used by the nodes within the neural network. Again, because each node has a threshold value, the combination of threshold values for the neural network may be represented as a matrix and stored by threshold matrix module 32 as one or more threshold matrices 38 in database 24 as depicted in FIG. 4. Threshold matrix module 32 may cooperate with components of recipient system 22 to enable a user to modify one or more thresholds within the neural network and thereby modify the amount of output generated by the neural network.

Although the weight values and threshold values are shown as being stored in matrices, other storage methods may also be used to store these values for use by neural network module 26. Node evaluation module 33 may comprise a module that performs the computations at each node to determine output node values based on input node values, weight matrices and thresholds as described above.

Learning computation module 34 may comprise a module that performs the learning computations for neural network module 26. Learning computation module 34 may comprise computer readable code that causes a computer to perform the computations described above to derive new values for the weight matrices based on the back-propagation or other feedback algorithm employed by neural network module 26.

The operations of system 10 may be better understood with reference to specific embodiments of the present invention. According to several embodiments of the present invention, neural network 26 determines whether information from a plurality of information sources should be provided as output to one or more objects that may then be provided to one or more recipients. Feedback to neural network module 26 may be used for future determinations regarding whether to output information to those objects.

Figure 5:
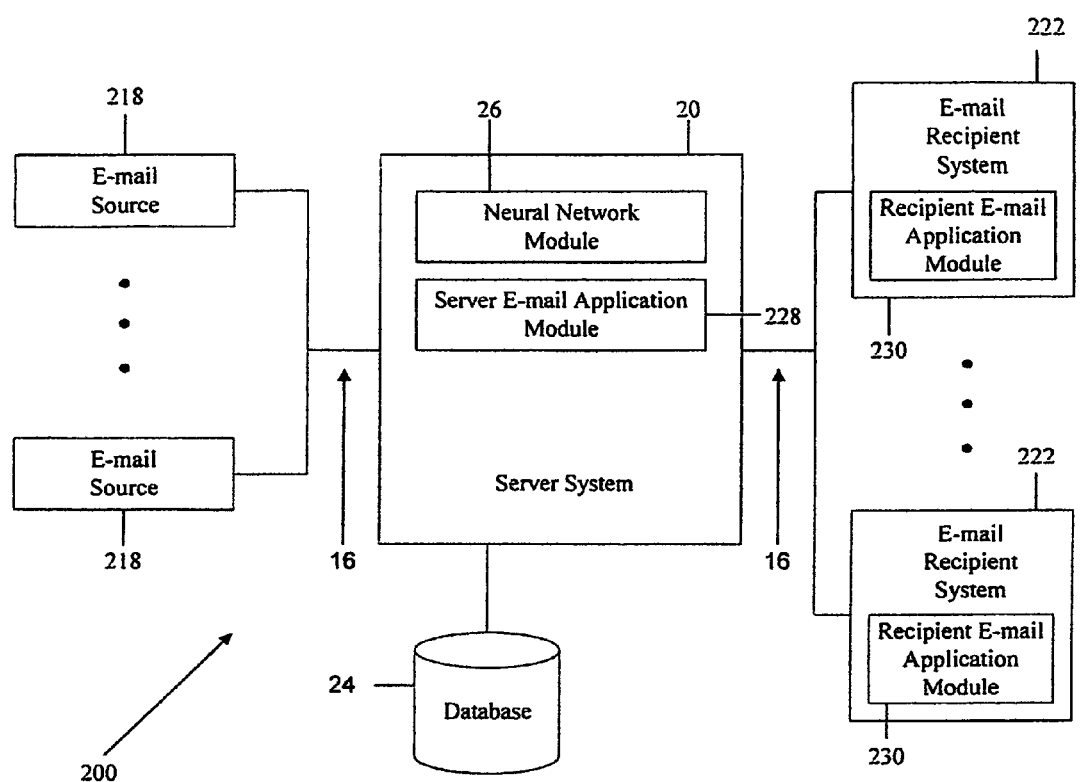
FIG. 5 is a block diagram of an electronic mail distribution system according to an embodiment of the present invention.

According to one embodiment, the information sources may comprise a plurality of electronic mail providers, the inputs may correspond to one or more attributes of those electronic mail providers and the objects may comprise electronic mail messages for specific electronic mail recipients. According to this embodiment, system 10 or lower tier system 12 may comprise a system 200 for distribution of electronic mail messages to a plurality of recipients. FIG. 5 depicts one embodiment of the present invention. According to this embodiment, a plurality of e-mail sources 218 and a plurality of e-mail recipient systems 222 are connected over network 16 to server system 20. Server system 20 comprises neural network module 26 and server e-mail application module 228. Like current list-serve systems, the plurality of electronic mail sources 218 may generate information over network 16 to server system 20 for distribution to a plurality of electronic mail recipient systems 222. Server e-mail application module 228 receives the incoming information from electronic mail sources 218 and generates electronic mail messages to electronic mail recipient systems 222. Server e-mail application module 228 may generate a separate electronic mail message that includes incoming information from each electronic mail source or may collect information over a given time period and generate one or more messages including the collection of information for that time period from the electronic mail sources that provide the information during that time period. In either event server e-mail application module 228 provides the message to each of the electronic mail recipient systems 222.

Server electronic mail application module 228 may cooperate with a neural network module 26 to determine which of the plurality of electronic mail recipient systems 222 to receive the information based on learning about the usefulness of that information to the various recipients. This overcomes several drawbacks of current list-serve systems. With current list-serve systems, all subscribers (recipients) on a list-serve receive all information generated by the server. If any particular subscriber does not find the information useful, the subscriber may either delete the messages each time or cancel the list-serve subscription. If subscribers find some information useful, but not other information, the subscriber likely will continue the service and must simply read every incoming message for the ones that may contain useful information.

Figure 6:
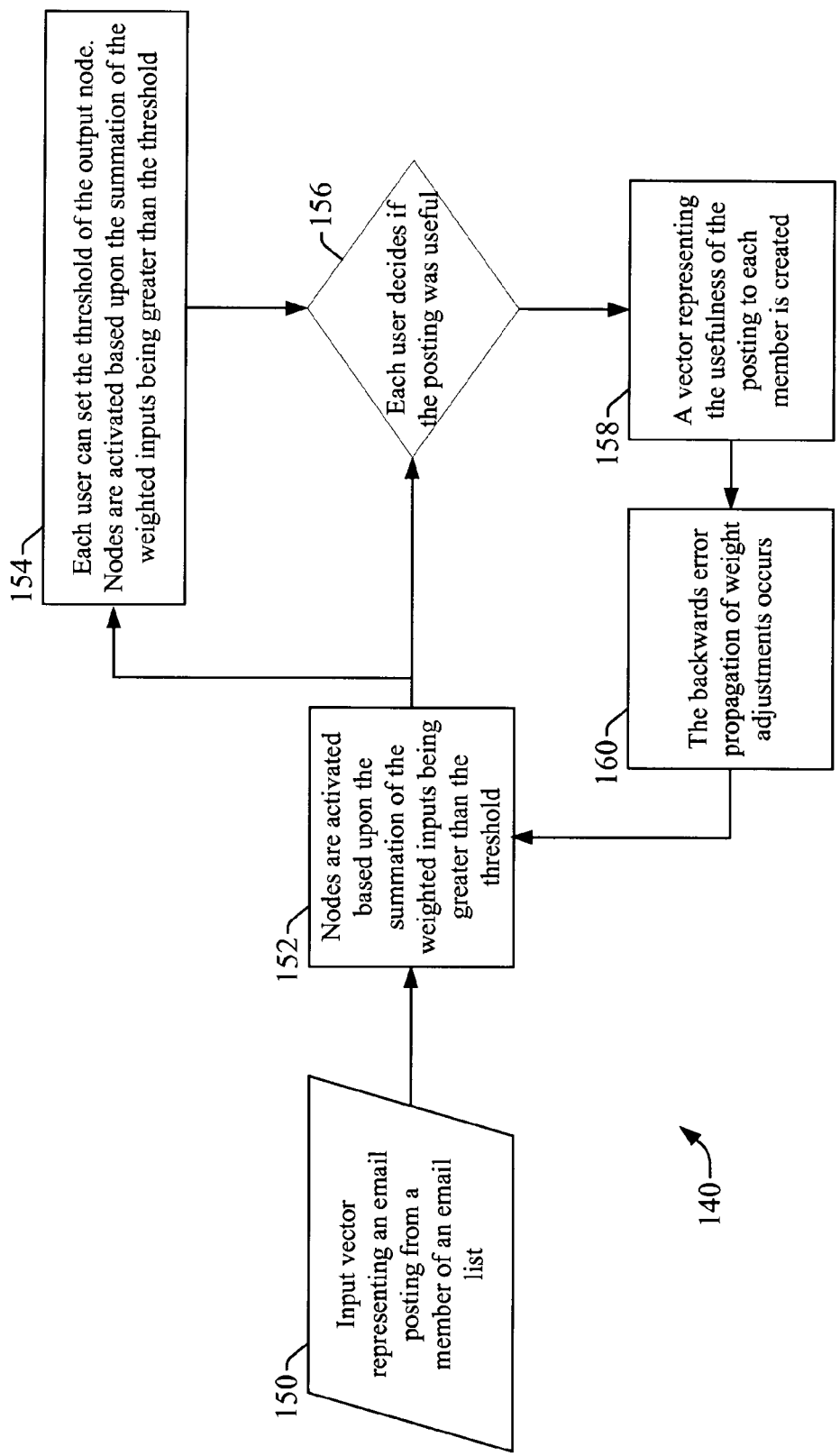
FIG. 6 is a block diagram of a method of operating an electronic mail distribution system according to an embodiment of the present invention.

FIG. 6 depicts a block diagram of a method 140 of operation of system 200 of FIG. 5. Method 140 comprises a plurality of steps that are iteratively performed to learn which recipients find certain information from the plurality of information sources (here the electronic mail providers) to be useful.

In step 150, an input vector representing which electronic mail sources 218 have provided information to a specific list-serve message is input into the neural network of neural network module 26. Specifically, the input vector comprises a number for each electronic mail source 218, each of which then corresponds directly to one input 100*a*-100*n* of the neural network used by neural network module 26. According to one embodiment, each electronic mail source 218 may comprise a unique identifier associated with that source. The unique identifier may comprise an alpha-numeric identifier, for example, although other methods may also be used. The input vector in this embodiment may represent the originator of information that is provided in a particular list-serve message.

For example, in a system of four electronic mail sources 218 (uniquely identified as A, B, C, and D) corresponding to input nodes 100*a*, 100*b*, 100*c*, and 100*d*, if a particular electronic mail message being generated by the system was generated by source C, then the input vector would be [0, 0, 1, 0] to input nodes 100*a*, 100*b*, 100*c*, and 100*d*. A one represents that the unique identifier corresponding to that input provided information to the message and a zero indicates that the unique identifier did not provide information for the message. If multiple mail sources provided information to a message, such as sources A and D, then the input vector would be [1, 0, 0, 1].

Next, in step 152, output nodes in the neural network are activated based on weighted values, thresholds and the input vector as described above. For example, suppose a system with four electronic mail recipients 222 (uniquely identified as recipients 1, 2, 3, and 4). Based on preassigned weight values and thresholds for an input vector [1, 0, 0, 0], neural network module 26 may output the output vector [0, 1, 1, 1]. This result would indicate that information provided from information source A is likely to be found useful by recipients 2, 3, and 4. In this embodiment, a one output value may indicate that the recipient corresponding to that node is likely to find the information from the particular source(s) of the incoming message to be useful based on past experience. Accordingly, server e-mail application module 228 may output the information to a plurality of electronic mail sources 222 indicated by neural network module 26 (the plurality of electronic mail messages generated thereby comprising the plurality of objects selected by server system 20 to receive the information). Here, recipients 2, 3, and 4 receive the message, but recipient 1 does not.

In step 156, each electronic mail recipient system 222 that receives the message may provide feedback regarding the usefulness of the information contained in the message. A positive response to the information may correspond to a one and a negative response may correspond to a zero. For example, in this example, suppose recipients 2 and 4 find the information useful, but recipient 3 does not. Recipients 2 and 4 would then provide positive feedback and recipient 3 may provide negative feedback. The feedback vector would then be [0, 1, 0, 1] as compared to an output vector of [0, 1, 1, 1].

For providing such feedback, according to one embodiment, each electronic mail recipient system 222 may comprise an electronic mail application module 230. Such a module may comprise any existing electronic mail viewing software operable on a computer or may comprise a specially designed module for use with the present system. Electronic mail application module 230 may comprise a mechanism that enables the recipient of the electronic mail from server system 20 to respond with feedback regarding the usefulness of the information contained in the message.

The feedback may comprise a binary feedback indicating either useful or is not useful. Also, a detailed feedback including a rating within a range of numbers or evaluation in a plurality of categories may be provided.

With the binary example, server e-mail application module 228 may treat any response from electronic mail recipient system 222 as a positive feedback regarding the usefulness of the information, for example. Such a system has the advantage of requiring minimal activity by the user in order to obtain feedback. In this example, if a user finds the information in the message received to be useful, they may simply reply to the message. The receipt of a reply at server system 20 from the electronic mail recipient may be treated as positive feedback. Similarly, no response within a predetermined time period may be treated as negative feedback.

In either event, a time period in which to provide feedback may be established. That time period may be termed an epoch for the neural network. At the conclusion of the epoch, the neural network may perform the back-propagation computations to prepare for the next set of inputs which would then begin the next epoch for the neural network. The epoch may be set to be either a set time, such as a day, or may be set to be the distribution of a particular message.

In step 158, at the conclusion of the epoch, neural network module 26 compiles a rating value for each of the output nodes (each corresponding in this example to a particular e-mail recipient system 222). In the binary example, the rating value may comprise a vector of ones or zeros corresponding to either positive or negative feedback regarding the usefulness of the information. For the example above in which recipients 2 and 4 find the information useful, the rating value may comprise a vector represented by [0, 1, 0, 1] compared to the output vector of [0, 1, 1, 1]. Because the output and the feedback differ, correction may be made by the neural network for future epochs based on the same inputs.

In step 160, back-propagation may be performed using the rating values generated in step 158 to determine new weight values based on the error indicated by the feedback vector. The error here being the difference between the output vector and the feedback vector. As a result of the back-propagation performed in step 160, a new weight value matrix is generated by learning computation module 34 and stored by weight value matrix module 30 in database 24 for use by step 152 based on a new set of input values 150 for the next epoch.

Figure 7:
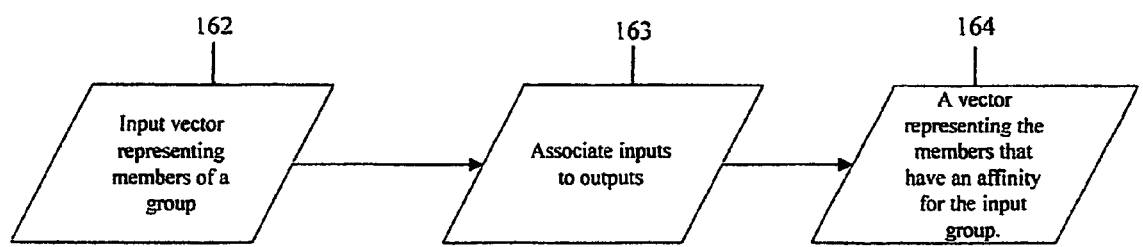
FIG. 7 is a block diagram of a method of operating a neural network system according to an embodiment of the present invention.
Figure 8:
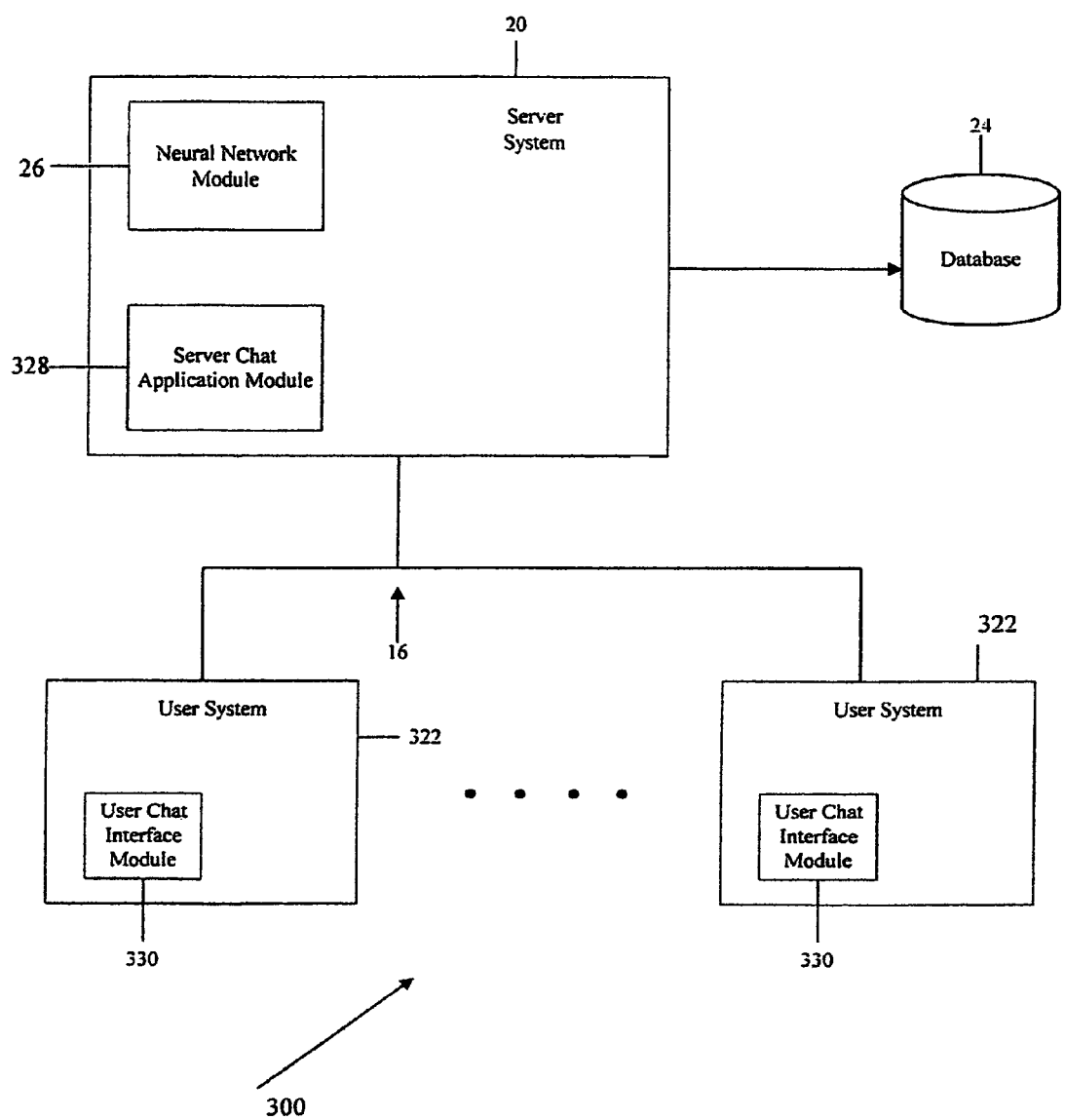
FIG. 8 is a block diagram of a chat distribution system according to an embodiment of the present invention.

The overall operation of the system then becomes as depicted in FIG. 7 in which input vectors are generated in step 162, associations are drawn in step 163 and output vectors are produced in step 164. Such a system may be used after learning desired weighting and threshold values after several feedback epochs.

It may be desirable to enable the recipients to modify the thresholds used by the neural network. Because threshold values are used in determining throughput in the neural network, if a particular user modifies its threshold, the amount of output to that user may increase or decrease accordingly. For example, if a user's threshold is set at 0.5 (on a scale of 0 to 1), the sum of the weighted inputs must be equal to or greater than 0.5 before the user will receive any output. If the user sets the threshold lower, however, the sum of the weighted inputs does not need to be as high. Accordingly, more output is likely to be generated to the user. If the user sets the threshold higher, less output is likely to be generated.

Recipient electronic mail application module 230 may comprise a mechanism that enables a user to modify the threshold such as a button or other portion of a graphical user interface. Also, the user may modify the threshold by including a number in a feedback reply for any message evaluated by that user. Other methods of enabling a user to modify the threshold for the system may be used, such as those described below with respect to other embodiments of the present invention.

Each input node 100 may correspond to one or more attributes of the plurality of e-mail sources 218. For example, attributes about each e-mail source may be determined. Attributes may include the name, birthday, birth year, astrological sign, location, age, gender, nationality, hobbies, interests, skills, income, race, business, zip code, phone number, service provider, access method, access server identifier or attributes, server software operated, business type, operating system used, web site address, electronic mail address, and the like. Each of these attributes may be assigned a unique identifier. Therefore, a group of input nodes may correspond to each e-mail source, within each node within the group corresponding to an attribute of that e-mail source.

By setting up the neural network with attributes of information providers, such as e-mail sources 218, as inputs, the neural network learns the usefulness of information based not only the identification of the sources of the information, but also based on other attributes of the sources. The neural network may then learn that certain recipients like information from sources of a certain age group, hometown or with certain hobbies, for example. Further, the output nodes may also correspond to attributes about the recipients. The neural network system may then learn what information appeals to what recipients based on the recipient's attributes. Communities of interest may thereby be developed between information sources and information recipients based on any number of attributes.

In another example, the input nodes to the neural network may also correspond to attributes of the content of the information to be included in the electronic mail messages, such as key words, subjects or topics. In this example, neural network module 26 determines whether to output information based on the content of the information rather than information about the attributes of the source of the information.

According to another embodiment of the present invention, the information sources may comprise chat participants, the inputs may comprise attributes of those chat participants and the objects may comprise viewers for the chat participants. For this embodiment, a chat distribution system 300 may be provided. In such a systems, a plurality of user systems 322 are connected over network 16 to server system 20. Server system 20 may comprise a server chat application module 328 that receives content from a plurality of users and formats that information into an output that is available to one or more of the plurality of users over the network. Many different chat applications exist and the functionality of these embodiments may operate according to existing chat applications with the following additional functionality.

Specifically, neural network module 26 may select what information participants in a particular chat room receive. To do so, neural network module 26 may treat attributes about the initiator of a particular chat message as inputs 100 to the neural network. For example, a unique identifier may be assigned to each chat participant. That identifier may be used as the input nodes 100 so that the neural network selects which objects should receive a message from a particular chat participant based on learning whether the user viewing these objects finds information from that particular chat participant useful. The output nodes therefore correspond to a plurality of objects to which chat information may be output. The objects may comprise chat content viewers for a plurality of participants. Each output node may therefore correspond to a particular chat participant's viewer. As such, in a binary system, a one value at an output node may indicate that a particular chat participant corresponding to that output node is selected by server system 20 to receive a particular chat message.

Accordingly, user systems 322 may comprise a user chat interface module 330 that enables users to participate in a chat by providing and viewing content. That information may be provided over network 16 to server chat application module 328 at server system 20. Server chat application module 328 may select which of a plurality of chat participants to receive the information. Each participant is treated as an input node and as an output node as well. Each participant that receives the content may provide feedback on that information. As such, the neural network learns which chat participants find information from which other chat participants to be useful. At the conclusion of an epoch, the neural network takes the feedback and redetermines the weight vector for future input. An epoch in this example may comprise the distribution of a single message and the feedback received may comprise feedback from each of the plurality of users regarding the usefulness of the single message. The epoch may take into account a predetermined period of time to enable participants to provide feedback. For example, an epoch may comprise the distribution of a chat message plus a period of thirty seconds, for example, to enable feedback. Also, because chat messages may appear very rapidly, it may be difficult to get feedback from users regarding every message. Accordingly, an epoch may be defined as a predetermined period of time and the feedback may be based on the initiator of content to the chat room.

Figure 9:
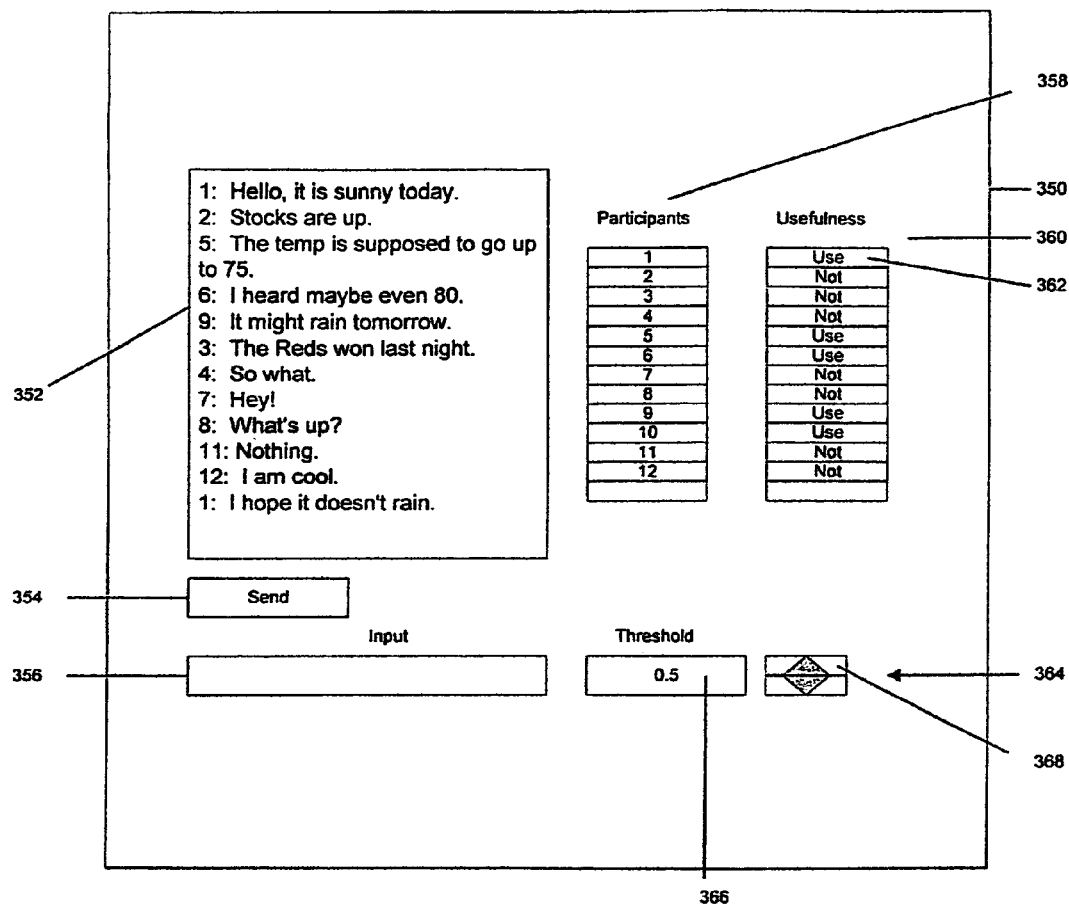
FIG. 9 is a block diagram of a chat viewer graphical user interface according to an embodiment of the present invention.
Figure 10:
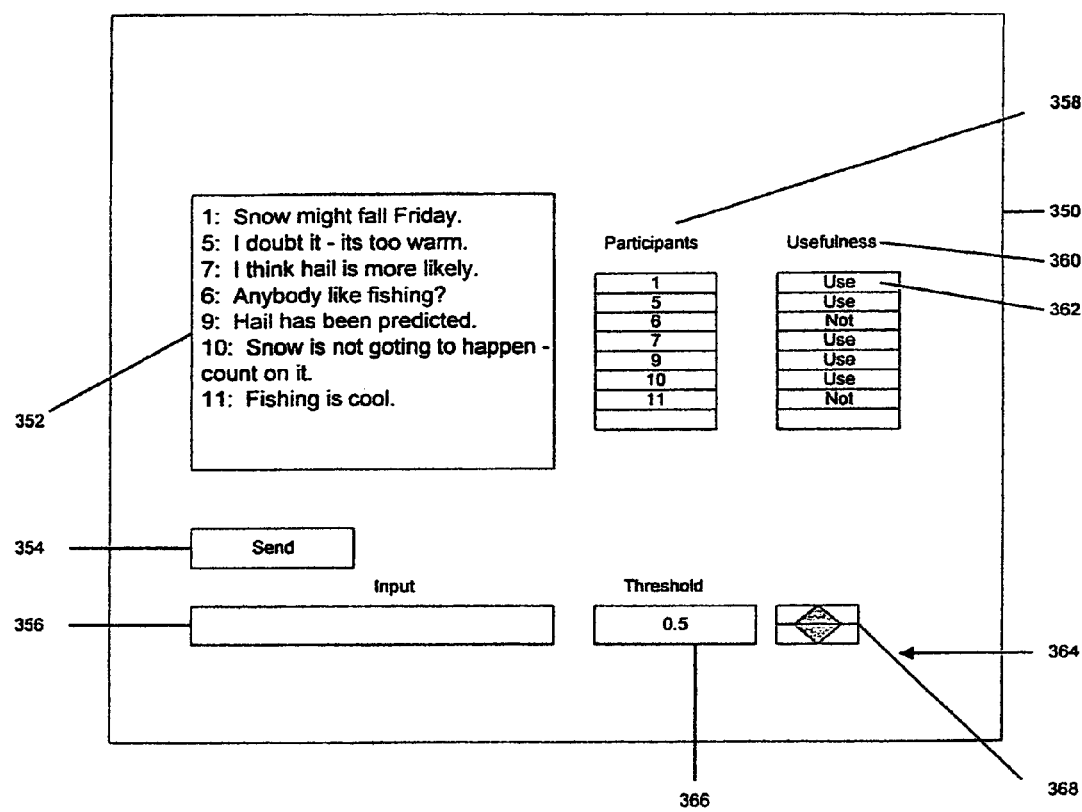
FIG. 10 is a block diagram of a chat viewer graphical user interface according to an embodiment of the present invention.
Figure 11:
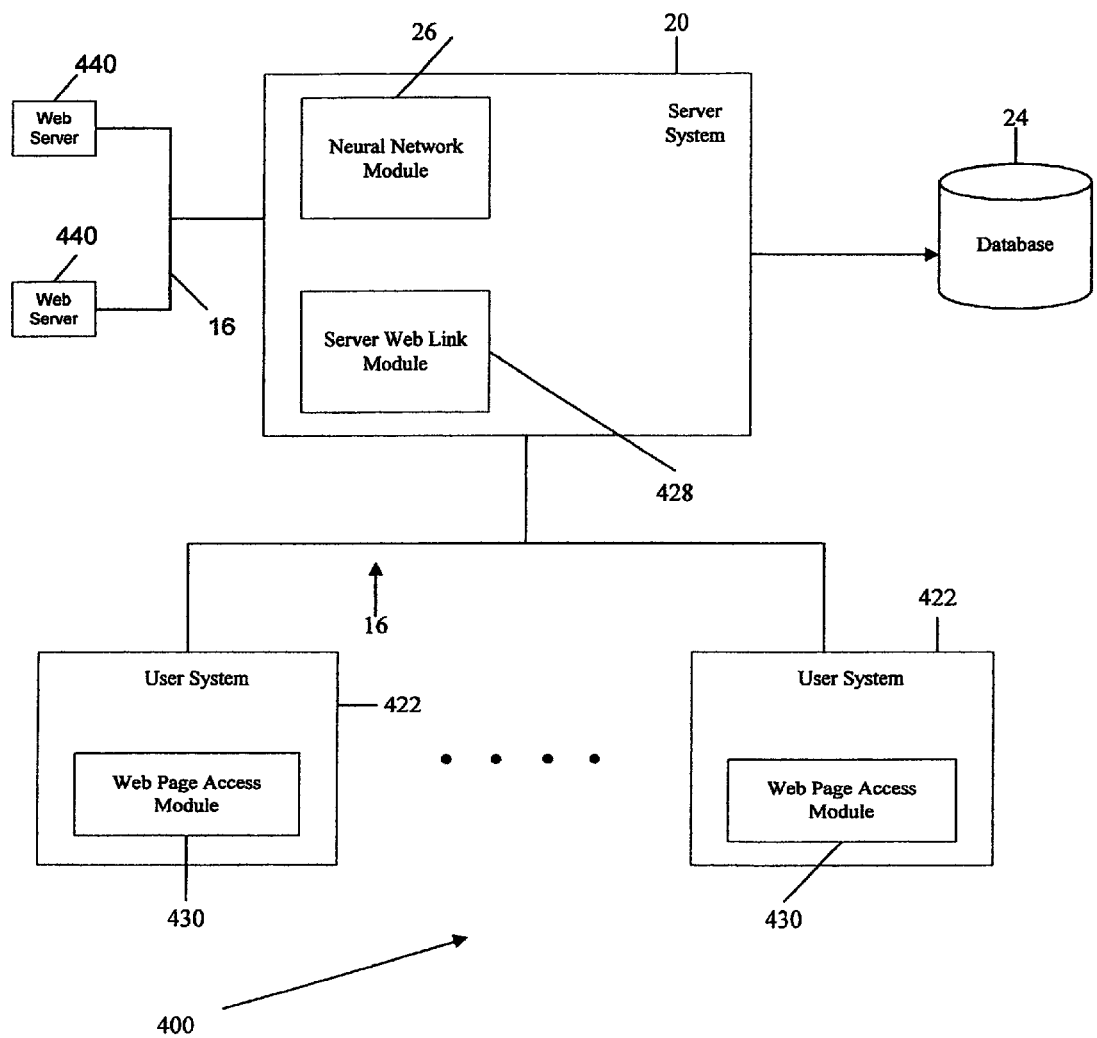
FIG. 11 is a block diagram of a web server link distribution system according to an embodiment of the present invention.

For purposes of example, FIGS. 9 and 10 depict a chat graphical user interface 350 for enabling a user to provide feedback regarding initiators of messages in a chat room. Chat graphical user interface 350 may be operated by server chat application module 328, user chat interface module 330 or a combination of the two. Chat graphical user interface 350 may comprise a viewer portion 352 containing received messages from other chat participants in this particular chat room, a send portion 354 for initiating messages, a content entry portion 356 for entry of information to be contained in a chat message, a chat participant display portion 358 that displays participants in the current chat room, a feedback portion 360 for enabling a user to provide feedback regarding messages, and a threshold portion 364 for enabling the user to change the threshold of information provided by chat distribution system 300. The operation of portions 352, 354, 356, and 358 may be according to existing systems or may comprise other portions for viewing and entering information into a chat message.

Feedback portion 360 may comprise a plurality of feedback selection portions 362 that may be selected by a user to determine feedback regarding the information received from a particular participant or message, for example. Each feedback selection portion 362 may correspond to a particular participant in chat participant display portion 358, for example. Also, feedback selection portions 362 may be presented corresponding to each message, as discussed above. Users may also be able to provide feedback for other values as well.

The example in FIG. 9 depicts an embodiment in which users evaluate participants' content over a predetermined period of time, the epoch in this example. In this example, a chat room dedicated to talking about the weather in a particular location has been established. Twelve participants are providing content and therefore, twelve feedback portions 362 are depicted. Each participant may provide feedback regarding the content provided by other participants during the epoch.

As may be seen from FIG. 9, this particular user has indicated that the information from participants 2, 3, 4, 7, 8, 11, and 12 is not useful because their content does not appear to be related to local weather—the topic for which this chat room was established. At the conclusion of the epoch, therefore, feedback by the participants in the chat room may be made regarding content provided from one or more of the particular participants during that epoch. The feedback may be used to redetermine the weights for the network for subsequent epochs.

That information may be used to determine which participants' content is output to the objects (in this case a participants' viewers) in subsequent epochs. Therefore, based on the user feedback as provided in FIG. 9, during the next epoch, as depicted in FIG. 10, the neural network may have corrected its output so that this user's view is not selected to receive output from one or more of participants 2, 3, 4, 7, 8, 11, and 12 that this user did not find useful during the previous epoch. As shown in FIG. 10, however, neural network module 26 is a learning module and may not completely correct during the subsequent epoch. The speed of correction is largely dependent on the acceleration function that is used in the back-propagation algorithm. For the present invention, a relatively moderate acceleration function may be used to avoid over-correcting based on feedback from a single epoch. Accordingly, messages from participant 11 may be selected for output to this user's chat viewer even though it was found not to be useful during a previous epoch.

Further, content may change over time. In FIG. 6, for example, participant 6 who was providing weather related content now wants to discuss fishing. Over time, this user has therefore found information from participant 6 no longer useful, whereas it was previously considered useful. The neural network is adaptive to account for changes in inputs and changes in tastes of feedback providers. At some point, this particular user may desire to discuss fishing and may find that content useful. The learning nature of the neural network adapts for those types of changes by making small steps to correct for errors rather than assuming each time that the output generated for a particular set of inputs is always going to be correct for those inputs.

Also, the back-propagation algorithm used according to the present invention may incorporate some randomness as well. As such, information that a viewer may have found not to have been useful during a number of epochs may nonetheless be selected by the neural network for distribution to the user's viewer (or other objects in other systems described herein). By incorporating some randomness, the neural network may adapt more readily for changes in tastes or improvement in content by an information source. Therefore, information sources may learn that their information has been assigned diminishing value by viewers and may seek to improve the content of information provided. Further, a recipient who may have found all information about fishing not to be useful may decide to take up fishing as a hobby and may later find it useful. With randomness, information about fishing may be randomly selected to be sent to this user and when positive feedback is received, additional information about fishing will be more likely to be selected to be sent to this user during subsequent epochs.

Also, a user may increase or decrease the amount of information received by modifying the threshold. Threshold portion 364 may comprise a threshold display portion 366 and a threshold modification portion 368. Threshold modification portion 368 may comprise a mechanism that enables a user to increase or decrease the threshold in increments. A user may also input a new threshold in threshold display portion 366 through the use of a keyboard, mouse or other data entry component.

According to other embodiments of the present invention, neural network module 26 may determine which of a plurality of available links to include in a link directory page based on feedback provided by users of the system that view the pages corresponding to these links and thereby determine the usefulness of those links. A link directory page may contain a portion that comprises one or more slots, which may be increased or decreased in number, each slot being able to contain a link displayed in that page. Several embodiments may be provided. For these embodiments, the inputs to the neural network may comprise viewers of links, attributes of viewers of links, attributes of links, key words associated with links, or a combination of any of these. The outputs may comprise link identifiers of links to be included in a link directory page. The epoch may comprise a click of a link, a visit to the web site or a period of time, such as a day, for example. Several examples of these combinations are described in more detail below.

According to another embodiment of the present invention, the information sources may be links, the inputs may be attributes of one or more recipients of a link distribution page, and the objects may comprise slots within the link directory page. Accordingly, a link distribution system 400 may be provided. In this embodiment, server system 20 comprises a server web link module 428 and user systems 422 may comprise a web page access module 430. Operation of server web link module 428 is described in more detail below. Server system 20 may store a plurality of web pages in database 24 and may also be connected to one or more other servers that provide information content, such as web servers 440.

Web page access module 430 may comprise any module that enables a user to view content, such as web pages, over network 16. For example, the web browsers licensed under the name Netscape Navigator™ and Microsoft Internet Explorer™ may be used to access the web site provided by link distribution system 400 and enable a user to view link directory pages provided at that site. If another type of link directory page is used, then access module 430 may comprise a module that enables a user to view that type of page.

According to this embodiment, link distribution system 400 may distribute one or more link directory pages over network 16. Link distribution system 400 may distribute such link directory pages through a web site, such as an Internet web site that is accessible to a plurality of users over the Internet.

In link distribution system 400, neural network module 26 may select which links to include in the slots within the link directory page based on various inputs. Therefore, in this embodiment, the slots in the link directory page are the objects available to receive information based on the determination made by neural network module 26. The link directory page may then be made available to one or more users for feedback.

The input nodes for the neural network in this example may correspond to the viewers of the link directory page. Each viewer of a link directory page may be represented by a different input node. Also, a grouping of input nodes may correspond to each viewer of the link directory page. The nodes within a grouping may correspond to various attributes of the viewer, such as the viewer's age, address, etc. as discussed above with respect to FIG. 5. The output nodes in this example may then be the links that are available for selection to be included in the slots of the link directory page. Unique identifiers of the links may be used, for example.

The association being drawn by the neural network then determines the epoch to be used. If a one to one correspondence between viewers of the link directory page or between attributes of viewers and links is desired, the epoch may be selected to be a single selection of a link on the link directory page. If there is a correspondence between individual viewers or attributes of viewers and groups of links, then the epoch may be selected to be a visit to the web site. If there is a correspondence between groups of people and links, then the epoch may be set to be a predetermined period of time, such as a day or other discrete time period.

Whatever the epoch selected, neural network module 26 receives as input a unique identifier or other attribute of the user that requests to view the link directory page. Web page access module 430 may provide this information or server web link module 428 may provide an interactive mechanism to request that information from the viewer. Based on the identifier or other attributes of the user as the input to the network, neural network module 26 selects which of a plurality of web links to include in the link directory page. That link directory page is then presented to the viewer by server web link module 428 through web page access module 430. The links that a particular user is most likely to like based on learned experience in the neural network are thereby provided based on the user's identification or other attributes about the user.

Figure 13:
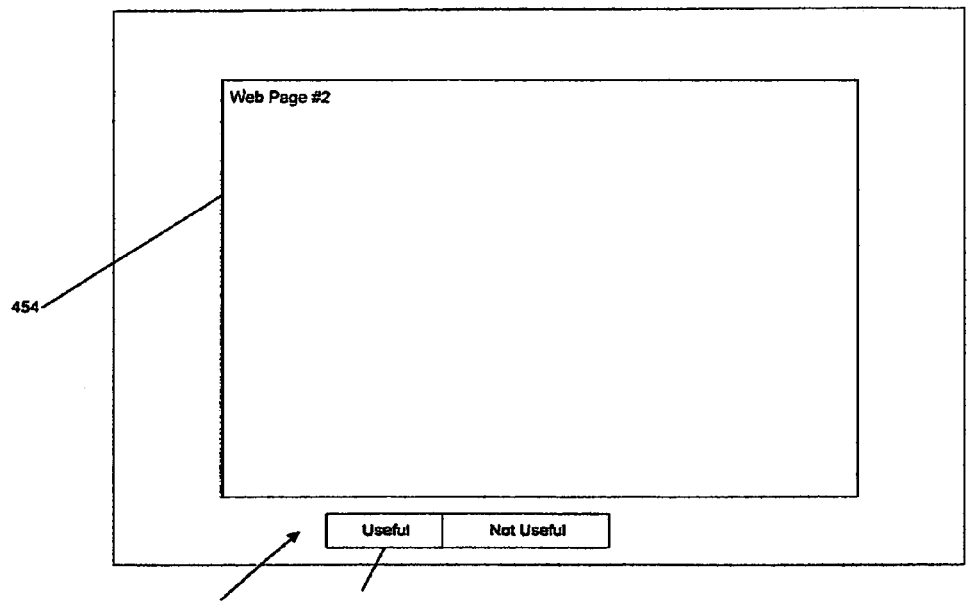
FIG. 13 is a page having a feedback portion according to an embodiment of the present invention.
Figure 12:
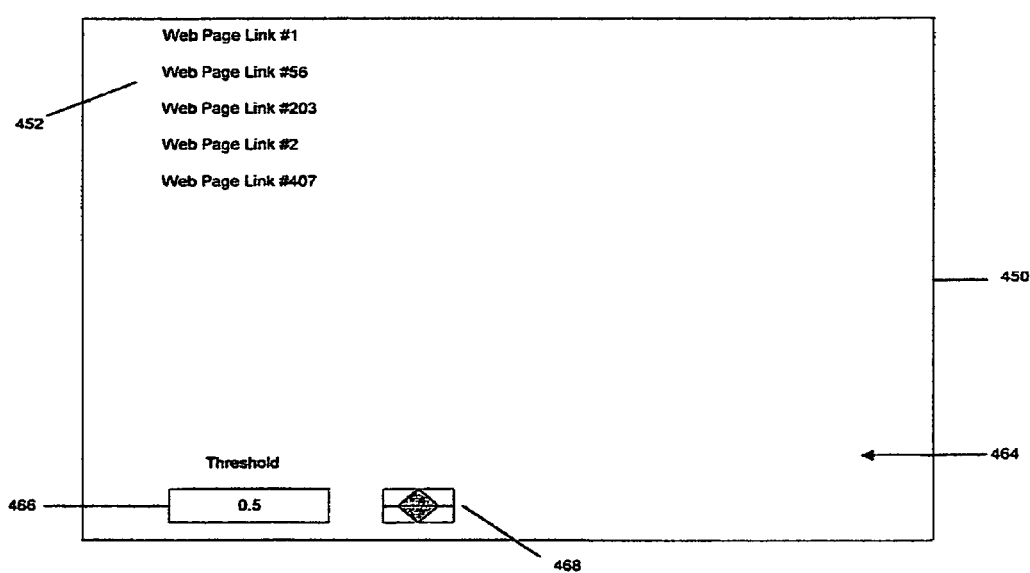
FIG. 12 is a link directory page according to an embodiment of the present invention.

If the epoch is a single selection, then after a user selects one of the links, the neural network redetermines the weight value matrix used. The selection may take place when the user clicks on a link in the link directory page or may take place after the user clicks on the link, views the page and then provides feedback through a feedback mechanism. For example, FIG. 12 depicts a link directory page 450 according to one embodiment of the present invention. Link directory page 450 comprises one or more slots 452 having listed therein a link and a threshold portion 464 which operates in a similar manner as threshold portion 364 described above. FIG. 13 may comprise a selected page having a page display portion 454 and a feedback portion 460. Feedback portion 460 may comprise one or more feedback selection portions 462 that enable a user to provide feedback about the page. The feedback may include the usefulness of the page to the user. That information may then be provided to server system 20 for feedback into neural network module 26 for subsequent epochs.

The epoch may also be set to be a visit to the web site. In this embodiment, the feedback may comprise all web sites selected from link directory page 450 or all web sites with useful content selected from link directory page 450.

The epoch may also be set to be a predetermined time period, such as a day. The feedback for this epoch would reflect any link visited that was selected from the link directory page or any link selected to have been useful. Over time, in this embodiment, the neural network learns what links a particular user finds useful, but also determines what links are useful generally. Also, by using attributes of the viewers as inputs, the neural network learns what attributes correspond to selecting or finding the content useful from the links presented in the link directory page. For example, the neural network may learn that all men viewers between the age of 25-35 find the links to sports web sites to be useful and women viewers between the age of 25-35 find health and fitness sites to be useful.

In these examples, feedback may be provided in a number of ways. Users that access the link directory page may provide feedback regarding the usefulness of the plurality of web links provided on that link directory page. Users may be permitted to do so, for example, by enabling the user to select a link to another page and then providing some mechanism for the user to provide feedback regarding the usefulness of the page after having reviewed the information provided in the page. For example, all of the pages listed on a particular link directory page may be stored in database 24 of server system 20. Accordingly, server system 20 may be able to serve all requested pages to a user of this system. Server web link module 428 may provide a mechanism that enables the user to generate feedback directly to server system 20 with each page distributed by server system 20. For example, a feedback button may be presented on each page distributed over the network when that page's link is selected from a link directory page.

It may also be desirable to provide link directory pages where the pages listed in the link directory page are located at various web servers 440 distributed across a network 16. As such, server web link module 428 may frame each page generated over network 16 and may present the content from another web server within the frame of the link directory page or some other page that is stored on server system 20. Therefore, the user's access to the linked server is made through server system 20 rather than directly to web server 440.

Also, a feedback mechanism may be provided directly in the link directory page so that the user may provide feedback directly in the link directory page. For example, a user may select a link, view the page corresponding to that link and then return to the link directory page to indicate whether that page was useful or not.

According to another embodiment of the present invention, associations between links may be learned by the neural network so that a page associated with a link may list links that a user is also likely to find useful. In such an example, attributes of a plurality of participating pages are treated as both the input to the neural network and the output to the neural network. The input nodes represent attributes about the pages that users visit. The output nodes represent attributes about links to the pages that the user is likely to find useful based on the current page. The objects selected by the neural network in this situation are the slots within the link directory page (in this example, the visited page with a portion for inclusion of links to other pages). According to this embodiment, server web link module 428 provides a user a page within the collection or mesh of pages through the user's web page access module 430.

In this embodiment, the epoch may again be either a single selection, a visit or a predetermined period of time, for example. Other epochs may also be used. If it is desired to determine correspondence between pages on a page by page level, then a single selection epoch may be provided. In such an example, when a user visits a linked site, feedback regarding the linked site is provided. Accordingly, over time, the neural network may learn that viewers of site A, when presented with sites B, C, and D as choices, prefer choice C as the next link. Feedback may be provided as described above with reference to FIGS. 12 and 13 or through some other mechanism. Again, the web pages included in the mesh may be stored by server system 20 but may also be stored at various web servers 440 distributed across network 16.

If it is desired to determine which links correspond best with particular pages within a mesh, then the epoch is better set to be a visit to the web site. All pages linked and feedback provided may be used to determine what links users find useful if they are already at a particular point in the mesh. For example, it may be determined that of five links posted on web page A, most viewers do not find three of them to be useful. Accordingly, in future epochs, only the two links that are useful may be selected by the neural network to be output to the objects (in this case the slots within the link directory portion of the visited page).

If broader associations between the pages are preferred, then the epoch may be set as a predetermined period of time. The feedback may then be all sites found to be useful. Eventually, sites that are not useful may be dropped from the links on all of the referring pages or may be listed on fewer referring pages.

According to another embodiment of the present invention, the information sources may comprise links, the inputs may comprise key words and the object may comprise a search result link directory page. The input nodes of neural network 26 in link distribution system 400 may comprise key words for a search engine. In this embodiment, server web link module 428 may comprise a web page search engine that provides links based on key words supplied by a user. Using the present invention, the search engine may produce results based not only on the inclusion of certain key words within a web page, but also upon feedback from users regarding the usefulness of those web pages when those key words were entered.

Figure 14:
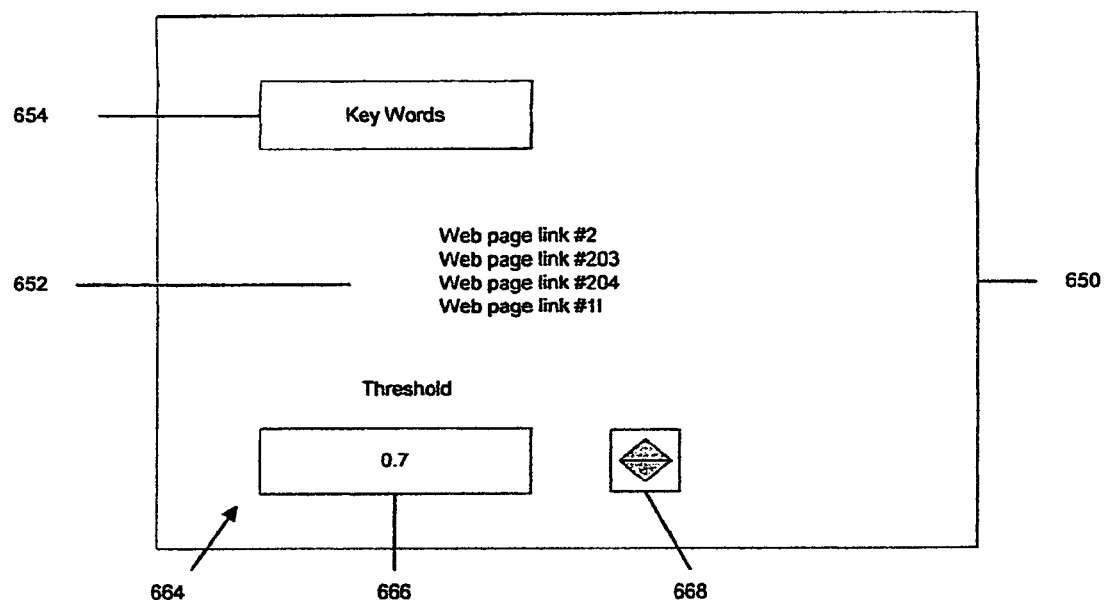
FIG. 14 is a link directory page according to another embodiment of the present invention.

Key words available for a search engine may be established as inputs and links available to be included in the link directory page (in this example, the search results page) as the output nodes. The objects that may be selected for inclusion of information (links in this example) are the slots within the link directory page. FIG. 14 depicts a link directory page 650 according to one embodiment of the present invention. In this embodiment, a key word entry and display portion 654 may be provided to display the key words that were input for the search. According to this embodiment, the epoch may be either a single selection, a visit to the search engine site or a predetermined period of time. Operation of the various epochs may be as described above.

Lower tier systems 12 may be connected to one or more other lower tier systems 12 and a hierarchical neural network system 14. Continuing levels of hierarchical structure may also be provided so that any number of tiers of systems may be provided. For illustration a two tier system is depicted in FIG. 1, however, it should be understood that any number of tiers may be provided and that such systems may operate between tiers as described below with respect to the two tiered system.

In this embodiment, every input node and every output node in each lower tier system 12 is provided a unique identifier. The unique identifier may be anything that uniquely identifies that input so that if the same input is provided as an input for different lower tier systems, the same unique identifier would be associated with the various inputs. For example, a user may be assigned a sixteen character alphanumeric unique identifier so that if that user participates in multiple chat rooms on various lower tier systems, hierarchical systems may identify that user as being the same.

As such, a hierarchical neural network may be established between all of the inputs and outputs on two or more of the lower tier systems using all of the inputs as inputs to the hierarchical neural network and all of the outputs as output nodes. Feedback may be provided based on feedback received at the selected lower tier systems and the epoch may be selected according to the information that is desired to be learned from the network. By providing a hierarchical system, relationships between users on different lower tier systems may be learned. Also, it may be learned that participants in one lower tier system are likely to find information in another lower tier system useful based on shared inputs and outputs such as attributes that are common between participants on those various systems. Many other combinations are possible when the inputs and outputs may include a vast array of information as described above with respect to the various embodiments of lower tier systems described. Combinations of different types of lower tier systems may be provided as well.

Further, although the present invention has been described using a neural network module 26, the artificial intelligence agent may also comprise any other artificial intelligence agent including a fuzzy logic device, expert system, or inference machine, for example.

According to one embodiment, various modules may comprise computer readable code which, when installed on a computer, perform the functions described above. Also, only some of the above-listed modules may be provided in computer readable code. For example, neural network module 26, application modules 28, weight value matrix module 30, threshold matrix module 32, learning computation module 34, server e-mail application module 228, recipient e-mail application module 230, server chat application module 328, user chat application module 330, server web link module 428, and web page access module 430 may comprise computer readable code that may be provided on a single or separate computer readable media.

Other embodiments, uses and advantages of the present invention will be apparent to those skilled in the art from consideration of the specification and practice of the invention disclosed herein. The specification and examples should be considered exemplary only. The intended scope of the invention is only limited by the claims appended hereto.

What is claimed is:

1. A system, comprising:
   means for conveying a first set of links to respective network locations in response to navigation to a first network location by a device;
   means for receiving a selection of one or more links, of the set of links, during an epoch comprising a duration of a visit to the first network location;
   means for assessing selection results of a plurality of epochs received from a plurality of devices, including means for altering at least one weight value associated with a respective at least one node of a neural network based on the selection results;
   means for learning a probability, based on the at least one weight value, that navigation to the first network location is to be followed by selection of a first subset of the set of links; and
   means for conveying a second list of links comprising the first subset of the set of links in response to a subsequent navigation to the first network location.

2. The system of claim 1, further comprising
   means for accepting, as one or more input nodes of the neural network, one or more first attributes of the first network location,
   wherein the means for conveying the second list of links includes means for selecting the first subset of the set of links based at least in part on a value of an output node of the neural network.

3. The system of claim 1, further comprising means for establishing an association between the first subset of the set of links and the first network location based on the probability.

4. The system of claim 1, wherein the means for assessing includes means for correlating the selection results with one or more attributes associated with the plurality of devices.

5. The system of claim 1, further comprising:
   means for excluding a second subset of the set of links during the subsequent epoch based on a determined probability that navigation to the first network location is not followed by selection of the second subset of the set of links.

6. A method, comprising:
   conveying, in response to selection of a first network location, a list of one or more links to respective one or more second network locations;
   modifying, as facilitated by one or more processors, at least one weight value associated with a respective at least one node of a neural network based on selection of a link, of the one or more links, by a device;
   learning, by the neural network based on the at least one weight value, that selection of the first network location during respective epochs is followed by selection, according to respective probabilities, of a first subset of the one or more links, the respective epochs comprising durations of time for visits to the first network location by the respective devices; and
   conveying, during a subsequent visit to the first network location, a modified list of the one or more links comprising the first subset of the one or more links based on the determining.

7. The method of claim 6, wherein the conveying the first list comprises conveying the list of links to respective web pages.

8. The method of claim 6, further comprising establishing, based on the learning, an association between the first network location and the first subset of the one or more links for a subset of the devices having at least one common attribute.

9. The method of claim 6, further comprising receiving, from at least one of the devices, feedback indicating a relevance of at least one link of the one or more links.

10. The method of claim 9, further comprising establishing, by the neural network, an association between the first network location and the first subset of the one or more links based on the feedback.

11. The method of claim 6, further comprising receiving selection of the first subset of the one or more links via web site interfaces associated with the devices.

12. The method of claim 6, further comprising:
   excluding a second subset of the one or more links from the modified list in response to determining that selection of the first network location is not followed, according to a probability, by selection of the second subset.

13. The method of claim 9, further comprising establishing an association between the feedback and one or more key words associated with the first network location.

14. The method of claim 13,
   further comprising selecting the one or more links for inclusion in the second list based at least in part on the association between the feedback and the one or more key words.

15. The method of claim 6, further comprising accepting, as one or more input nodes of the neural network, one or more first attributes of the first network location, wherein the conveying the modified list includes selecting the first subset of the one or more links based at least in part on a value of an output node of the neural network.

16. A non-transitory computer-readable medium having stored thereon computer executable instructions that, in response to execution, cause a computing system to perform operations, including:
   sending a set of links via a network, in response to navigation to a first network location, for presentation in a page of slots associated with the first network location, the set of links corresponding to a set of respective second network locations;
   adjusting one or more weight values corresponding to respective one or more nodes of a neural network based on selections of one or more links, of the set of links, by a computing device during an epoch, the epoch comprising a duration of a visit to the first network location by the computing device;

learning, by the neural network based on the one or more weight values, that navigation to the first network location is likely to be followed by selection of a first subset of the set of links; and selecting, by the neural network, the first subset of the set of links for inclusion in the page of slots for a subsequent epoch based on the learning.

17. The computer-readable medium of claim 16, wherein the selecting includes:

accepting, as a value of at least one input node of the neural network, at least one attribute of the first network location in response to navigation to the first network location during the subsequent epoch; and selecting the first subset of the set of links based on at least one value of a respective at least one output node of the neural network.

18. The computer-readable medium of claim 16, the operations further including:

learning, by the neural network based on the one or more weight values, that navigation to the first network location is not followed by selection of a second subset of the set of links for a majority of multiple epochs; and excluding the second subset of the set of links from the page of slots for the subsequent epoch.

19. The computer-readable medium of claim 16, wherein the learning includes learning, by the neural network based on the one or more weight values, that navigation to the first network location is likely to be followed by the selection of the first subset of the set of links for computing devices associated with least one common attribute; and the selecting includes selecting the first subset of the set of links for inclusion in the page of slots for the subsequent epoch for computing devices associated with the at least one common attribute.

20. The computer-readable medium of claim 16, the operations further including:

receiving feedback from the computing device indicating relevance of at least one of the one or more links, wherein the selecting the first subset of the set of links for inclusion in the page of slots is further based on the feedback.

21. The computer-readable medium of claim 16, wherein the learning includes learning, by the neural network, that navigation to the first network location is likely to be followed by selection of the first subset of the set of links for computing devices having at least one common attribute; and wherein the selecting includes selecting the first subset of the set of links for the computing devices having the at least one common attribute.

22. A system, comprising:

a processor;

a memory communicatively coupled to the processor and having stored thereon computer-executable components that implement the system, including:

a neural network;

an application module configured to present a first list of links to web pages in response to navigation to a first web page by a first device and receive a selection of at least one link in the first list of links during an epoch, the epoch comprising a duration of a visit to the first web page; and a neural network module configured to modify the one or more weight values of respective one or more neural network nodes of the neural network based on the selection of the at least one link during the epoch;

wherein the neural network is configured to learn, based on the one or more weight values, that navigation to the first web page is likely to be followed by selection of a subset of links of the list of links; and wherein, in response to a subsequent navigation the first web page, the application module is further configured to present a second list of links comprising the subset of links based at least on at least one output of the neural network.

23. The system of claim 22, wherein the application module is further configured to receive, from the first device, feedback indicating a relevance of at least one of the first subset of links.

24. The system of claim 23, wherein the neural network is further configured to:

establish an association between the feedback and one or more keywords in a query used to invoke the first web page; and determine whether to include the subset of links in the second list of links based on the association between the feedback and the one or more keywords in response to a subsequent query including the one or more keywords.

25. The system of claim 22, wherein the neural network is further configured to receive at least one attribute value of the first web page as a respective at least one input node value, and to select the second list of links based on at least one output node value.

* * * * *

UNITED STATES PATENT AND TRADEMARK OFFICE
CERTIFICATE OF CORRECTION

PATENT NO. : 8,260,733 B2  
APPLICATION NO. : 11/544858  
DATED : September 4, 2012  
INVENTOR(S) : Sullivan et al.

Page 1 of 2

It is certified that error appears in the above-identified patent and that said Letters Patent is hereby corrected as shown below:

On the Title Page, in item (56), under "OTHER PUBLICATIONS", in Column 2, Line 2, delete "Garloch" and insert -- Garloch, --, therefor.

On the Title Page, in item (56), under "OTHER PUBLICATIONS", in Column 2, Line 3, delete "Groups"" and insert -- Groups," --, therefor.

On the Title Page, in item (56), under "OTHER PUBLICATIONS", in Column 2, Lines 3-4, delete "Laboratory. Oct. 1997." and insert -- Laboratory, Oct. 1997, --, therefor.

On Page 2, in item (56), under "OTHER PUBLICATIONS", in Column 2, Line 1, delete "Spich." and insert -- Spich, --, therefor.

On Page 2, in item (56), under "OTHER PUBLICATIONS", in Column 2, Line 3, delete "Negotiations"" and insert -- Negotiations," --, therefor.

On Page 2, in item (56), under "OTHER PUBLICATIONS", in Column 2, Line 5, delete "Downoaded" and insert -- Downloaded --, therefor.

On Page 2, in item (56), under "OTHER PUBLICATIONS", in Column 2, Line 21, delete "US Application U.S. Appl. No." and insert -- U.S. Appl. No. --, therefor.

On Page 2, in item (56), under "OTHER PUBLICATIONS", in Column 2, Line 27, delete "comitech/" and insert -- com/tech/ --, therefor.

On Page 2, in item (56), under "OTHER PUBLICATIONS", in Column 2, Line 29, delete "al," and insert -- al., --, therefor.

On Page 2, in item (56), under "OTHER PUBLICATIONS", in Column 2, Line 30, delete "Hetercigeneous" and insert -- Hetrogeneous --, therefor.

Signed and Sealed this  
Twelfth Day of February, 2013

Teresa Stanek Rea  
*Acting Director of the United States Patent and Trademark Office*

CERTIFICATE OF CORRECTION (continued)
U.S. Pat. No. 8,260,733 B2

On Page 2, in item (56), under "OTHER PUBLICATIONS", in Column 2, Line 34, delete "al." and insert -- al., --, therefor.

On Page 2, in item (56), under "OTHER PUBLICATIONS", in Column 2, Line 36, delete "al," and insert -- al., --, therefor.

On Page 2, in item (56), under "OTHER PUBLICATIONS", in Column 2, Line 39, delete "al," and insert -- al., --, therefor.

In Fig. 10, Sheet 9 of 12, for Tag "352", in Line 6, delete "goting" and insert -- going --, therefor.

In Column 10, Line 60, delete "is not" and insert -- not --, therefor.

In Column 12, Line 35, delete "such a" and insert -- such --, therefor.

In Column 19, Line 41, in Claim 2, delete "comprising" and insert -- comprising: --, therefor.

In Column 20, Line 15, in Claim 7, delete "the first" and insert -- the --, therefor.

In Column 21, Line 31, in Claim 19, delete "least" and insert -- at least --, therefor.

In Column 22, Line 30, in Claim 23, delete "the first" and insert -- the --, therefor.

In Column 22, Line 36, in Claim 24, delete "keywords" and insert -- key words --, therefor.

In Column 22, Line 40, in Claim 24, delete "keywords" and insert -- key words --, therefor.

In Column 22, Line 41, in Claim 24, delete "keywords." and insert -- key words. --, therefor.